US006754047B2

(12) United States Patent
Pan et al.

(10) Patent No.: US 6,754,047 B2
(45) Date of Patent: Jun. 22, 2004

(54) SLIDE MICROACTUATOR USING S-SHAPED PIEZOELECTRIC ELEMENT

(75) Inventors: Tzong-Shii Pan, San Jose, CA (US); Satya Arya, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 106 days.

(21) Appl. No.: 10/128,898

(22) Filed: Apr. 24, 2002

(65) Prior Publication Data

US 2003/0202290 A1 Oct. 30, 2003

(51) Int. Cl.[7] .................................................. G11B 5/56
(52) U.S. Cl. ................................. 360/294.4; 360/234.6
(58) Field of Search .......................... 360/294.4, 294.7, 360/234.6, 234.5

(56) References Cited

U.S. PATENT DOCUMENTS

| | | | | |
|---|---|---|---|---|
| 6,166,890 A | * 12/2000 | Stefansky et al. | ....... | 360/294.4 |
| 6,404,600 B1 | * 6/2002 | Hawwa et al. | ........... | 360/294.4 |
| 6,512,659 B1 | * 1/2003 | Hawwa et al. | ........... | 360/294.6 |
| 2001/0055182 A1 | * 12/2001 | Wu et al. | ................ | 360/294.4 |
| 2003/0053264 A1 | * 3/2003 | Chen et al. | .............. | 360/294.4 |

FOREIGN PATENT DOCUMENTS

| | | |
|---|---|---|
| JP | 10392979 | 11/1998 |
| JP | 63281212 | 11/1998 |
| JP | 11273284 | 10/1999 |
| JP | 2000100097 | 7/2000 |

* cited by examiner

*Primary Examiner*—Jefferson Evans
(74) *Attorney, Agent, or Firm*—Ohlandt, Greeley, Ruggiero & Perle, L.L.P.

(57) ABSTRACT

A microactuator device for effecting fine positioning of a transducing head with respect to a selected track on a disk having: an S-shaped piezoelectric element with three or more legs having opposite ends, wherein either; one end of the piezoelectric element is affixed or connected to one end of the slider, and the other end is affixed or connected to the flexure member, or both ends of the element affixed to corresponding ends of the slider and the center is affixed to the flexure, for obtaining movement of the head transducer to enable fast and accurate tracking of read/write tracks on a high track density disk. Attachment of the one leg of piezoelectric element to the flexure produces translation movement of the slider and head transducer while attachment of the center leg of the element to the flexure and the two ends legs to the slider produces a rotary movement of the head transducer.

7 Claims, 3 Drawing Sheets

SLIDE MICROACTUATOR USING S-SHAPED PIEZOELECTRIC ELEMENT

FIELD OF THE INVENTION

The present invention relates to disk drive systems and, more particularly, to microactuator devices that function to provide fine movements of a transducing head so that densely spaced tracks on a disk may be accurately selected and followed to read and write more data on disk.

BACKGROUND OF THE INVENTION

The present invention particularly pertains to a microactuator device for use in a multiple track disk drive system so that fine positioning of a transducing head over a selected track of the disk may be obtained, and more particularly, to a piezoelectric microactuator device that provides a simplified, low-cost construction when compared with the prior art designs.

Magnetic disk drives are information storage devices that use thin film magnetic media to store data. A typical disk drive as seen in FIG. 7 of U.S. Pat. No. 6,166,890, the disclosure of which is incorporated herein, includes one or more rotatable disks having concentric data tracks in which data is read or written. As a disk rotates, a head transducer, also referred to as a magnetic recording head, is supported by a slider and positioned by an actuator element to magnetically read data from, or write data to, various tracks on the disk. Typically, the head transducer is attached to a slider having an air-bearing surface, which is supported adjacent to a data surface comprising the data tracks by a film of air generated by the rotating disk. Suitable wires connect the transducer on the slider to a data processing unit that controls read/write electronic circuitry.

The radial spacing between data tracks continues to decrease with increase in recording density, requiring greater precision for head positioning. External and internal disturbances in a disk drive continuously move the head transducer off the data track. Conventional disk drives correct for off-track motion by actuating the arms carrying the head transducers using a voice coil motor. See the Figures of U.S. Pat. No. 6,115,223, the disclosure of which is incorporated herein by reference. However, a voice coil motor lacks fast response and sufficient resolution for small motions required to effectively maintain position of head on a track of a high-track density disk. Therefore, a secondary fast response high-resolution head positioning mechanism is necessary for small motions to reduce track registration error in high-density disk drives.

Some of the prior art piezoelectric microactuator designs correct for hard disk drive disk track misregistration. These include designs with piezoelectric microactuators mounted on arm, on suspension near hinge, or near or under the slider carrying the head transducer. Designs with piezoelectric microactuators mounted on the arm produce highest slider movement but excite undesirable voice coil motor coil, arm and suspension load beam modes. Designs with piezoelectric microactuators mounted near the hinge produce medium slider movement but excite undesirable arm tip and suspension modes. Designs with piezoelectric microactuators mounted near the slider produce small slider movement but excite minimum undesirable modes of flexure and load beam. Location of piezoelectric microactuators shall depend on a drive configuration and requirements.

The prior art Japanese patent 63-291271 has a piezoelectric element (formed by a U-shape through groove in a piezoelectric material plate) mounted under and concentric to the slider and appears only to provide translation motion along the long axis of the suspension more suitable for linear and not rotary actuators. Present invention differs in configuration of piezoelectric element, provides rotary motion in addition to the translation motion across the recorded data tracks, and is intended for use with rotary actuators.

U.S. Pat. No. 5,856,896 ("'896 patent") teaches the use of two parallel piezoelectric elements on the leading edge of the slider attached to a suspension. It further teaches the use of a compliant shear layer connecting the slider and the suspension. The design of the "896 patent has the disadvantage of using two piezoelectric elements instead of a single element. The design must also deal with fatigue problem related to the compliant layer. Japanese references JA 0097174 and JP 10-027446 also teach the use of two piezoelectric elements polarized in opposite direction and placed under the slider for angular motion. However, normal placement inaccuracies associated with the use of two piezoelectric pieces could result in asymmetrical loading, which in turn could result in undesirable dynamic modes. Also, accurate placement and bonding of two piezoelectric microactuators instead of one is more expensive. Present invention solves these problems by having a simple single element that is polarized in only one direction and placed accurately at slider center.

U.S. Pat. No. 6,166,890 discloses the mounting of the piezoelectric microactuators in the same plane and near the slider. The problem with this approach is that the design has a more complex mechanism like a cradle, is more fragile, excites more undesirable dynamic modes, and is more expensive to manufacture.

SUMMARY OF THE INVENTION

The present invention relates to piezoelectric microactuator locations under the slider and differs from others for having a simple low cost configuration, for providing a choice of rotary or translation motion of the slider based on attachment, and for moving transducer head across the tracks. The invention also offers alternate compact piezoelectric element with configurations that have large effective length for many times head movement to help in faster seek and settle. The invention also offers compact piezoelectric element configurations that produce many times larger force to overcome resistance of stiff suspension structures required by some applications.

The present invention involves an S-shaped piezoelectric element placed under the slider with leading leg bonded to the leading edge of the slider and trailing leg bonded to the flexure tongue. The leading and trailing legs of the S-shaped piezoelectric element are both polarized in the same direction. An application of electrical voltage to the top and bottom surfaces of the piezoelectric element results in a across the track translatory movement of the slider and head. Alternately, attachment of the center of the piezoelectric element to flexure and both ends to slider results in rotary movement of slider and head transducer across the track when voltage is applied. In addition, the S-shaped piezoelectric element can have more than three legs resulting in either increase in actuation force or increase in head movement based on configuration described above. The across-track motion due to the piezoelectric element is utilized by servo system to correct for off-track head motion caused by dynamic disturbances, thereby resulting in more accurate track following and recording of more data tracks on a disk for increased capacity and reduced seek time of a hard disk drive. The S-shape with three or more legs is formed by multiple recesses part of the way across the width from alternate sides into a flat piezoelectric material.

Briefly stated then, a fundamental provision of the present invention is defined as follows:

a disk drive system having an actuator arm to support a slider carrying a transducing head adjacent a selected data track of a rotatable disk having a plurality of concentric data tracks, the slider having an air-bearing surface generally parallel to and confronting the top surface of the rotatable disk, wherein a microactuator device effects fine positioning of the transducing head with respect to the selected data track, the microactuator device comprising the slider carrying a transducer head; a flexure, and an S-shaped piezoelectric element having opposite ends, wherein one end of the piezoelectric element is affixed or connected to one end of the slider, and the other end is affixed or connected to the flexure member for obtaining translation movement of the slider head transducer to enable tracking of the disk. Alternately, both ends of the piezoelectric element could be affixed to two ends of slider and center affixed to the flexure over dimple for pure rotary motion of the slider.

The foregoing and still further objects and advantages of the present invention will be more apparent from the following detailed explanation of the preferred embodiments of the invention in connection with the accompanying drawing.

DESCRIPTION OF THE PREFERRED EMBODIMENTS

In order to appreciate the context of the present invention; i.e., the disk drive system into which the present microactuator device is incorporated, reference may be made to FIG. 8 of the aforementioned U.S. Pat. No. 6,166,890. It will be seen therein that suitable controls enable both gross and fine resolutions of the actuator arm and the transducer head movements, respectively, with respect to the rotating disks for track selection.

Figure 1A:
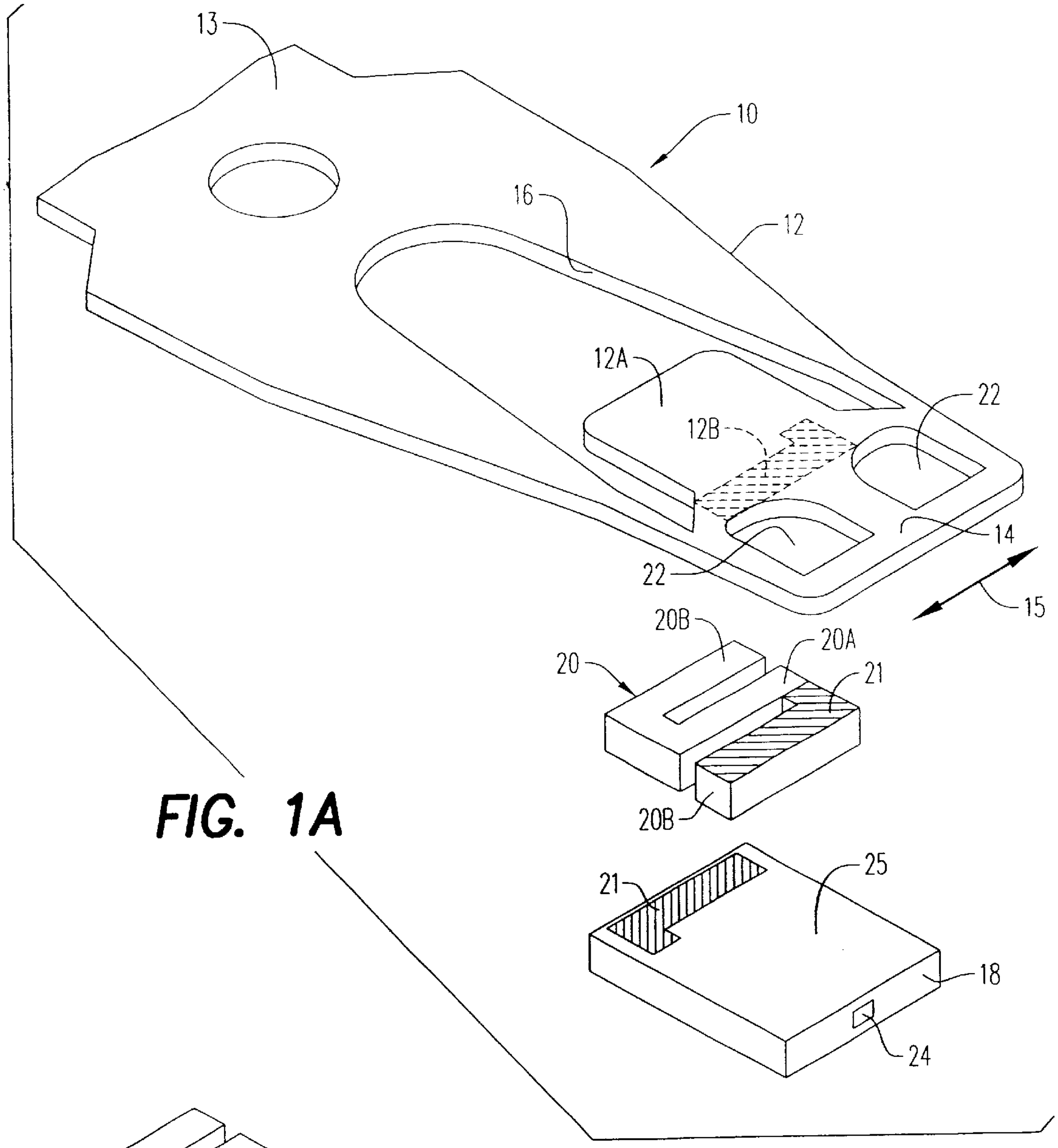
FIG. 1A is an exploded perspective view of one embodiment of the microactuator device of the present invention.
Figure 3:
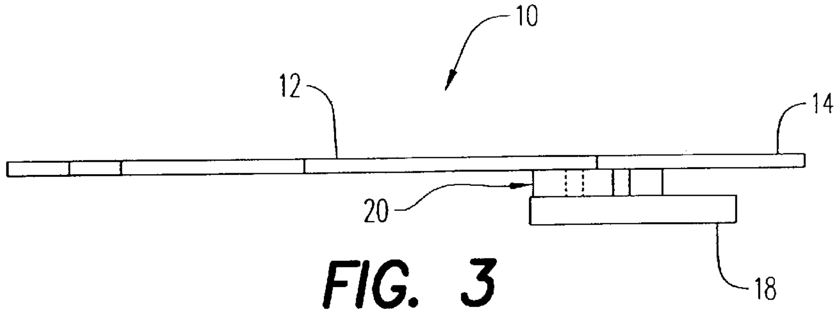
FIG. 3 is a side elevation view of such device.
Figure 4:
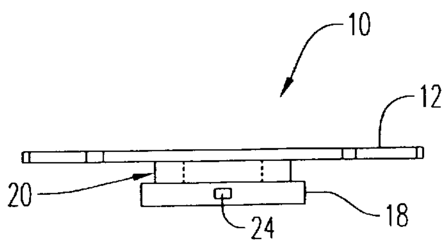
FIG. 4 is an end view of such device.

Referring now to the Figures of the drawing, and particularly to FIG. 1A, there is depicted a microactuator device 10 including a flexure member 12 which has one end 13 that could be welded to a load beam (not shown). An opening 16 is formed in the flexure member to define a tongue portion 12A, and to provide enhanced flexibility for tongue movement and gimbeling of the flexure over a dimple formed in the load beam not seen. A slider 18 is positioned below the flexure member, as best seen in FIGS. 3 and 4. The microactuator element 20 is a piezoelectric crystal in the shape or form of a S-shaped block, comprising a central portion 20A and two leg portions 20B.

As indicated by the diagonal lines, the leg portions 20B of the piezoelectric crystal 20 are attached by suitable bonding material 21—one leg 20B, for example on the right in FIG. 1A, being attached to the flexure member 12 at portion 12B, while the other leg 20B is attached to the slider 25. Alternately, as shown in FIG. 5A, center leg 20B of the piezoelectric element 20 is attached by bonding material 21 to the flexure (above load beam dimple), and the ends of the other two legs 20A are attached to the slider 25 by means of bonding material 21 at the corners thereof.

Figure 1B:
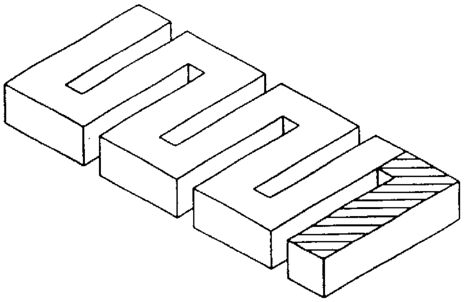
FIG. 1B shows second embodiment
Figure 2:
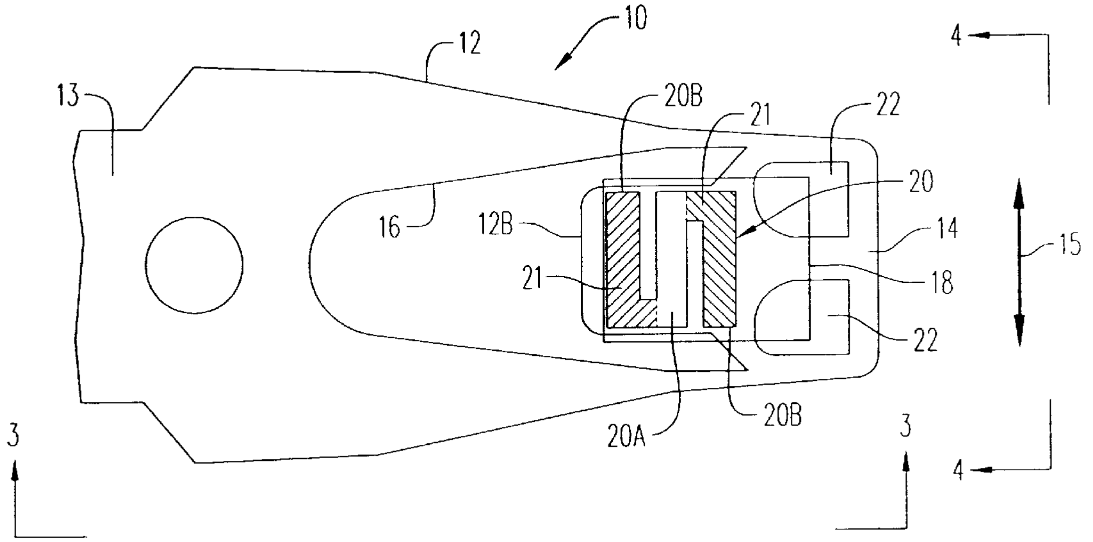
FIG. 2 is a top plan view of the microactuator device of FIG. 1A.
Figure 5A:
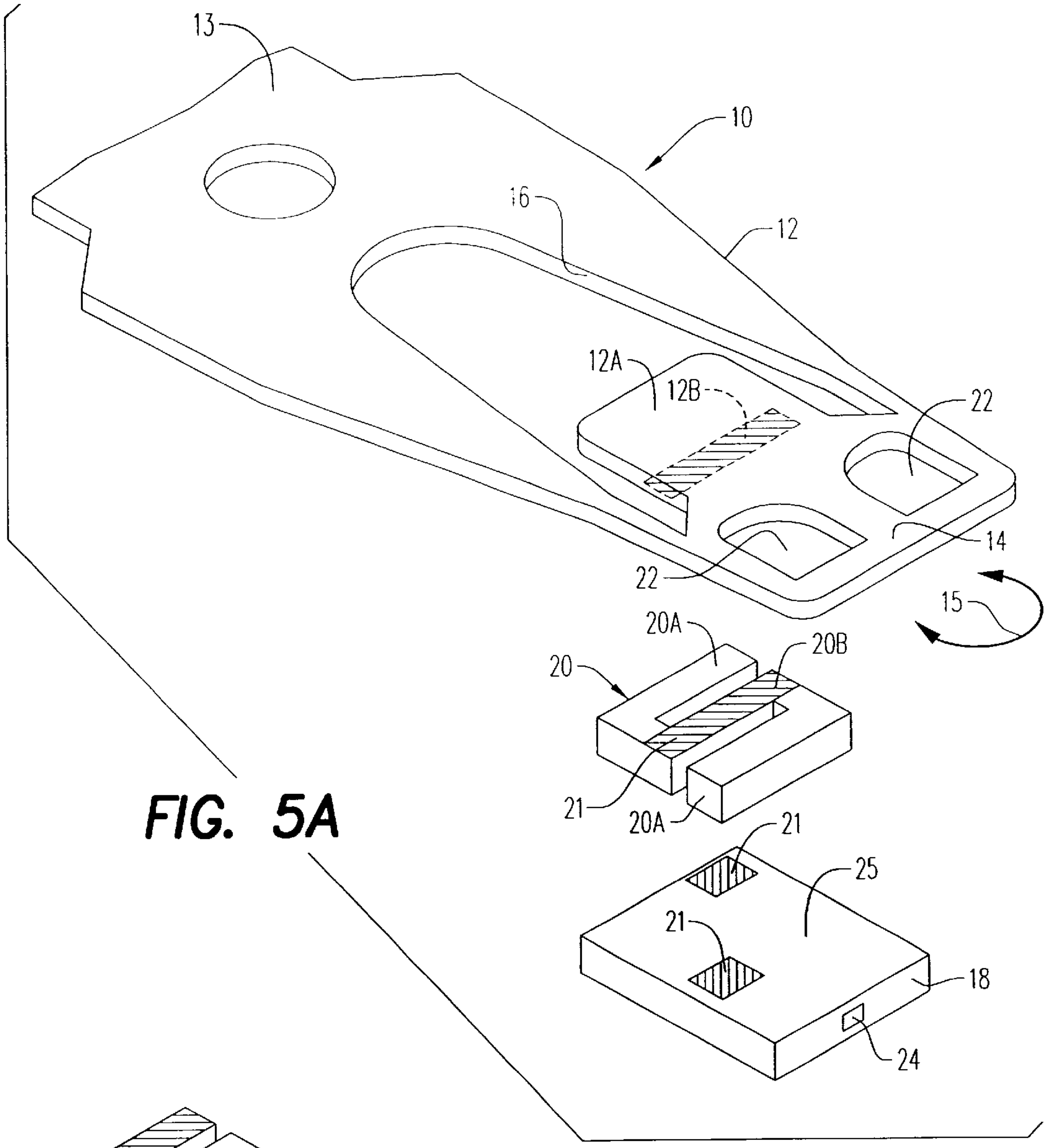
FIG. 5A is an exploded perspective view of an alternate attachment method.
Figure 5B:
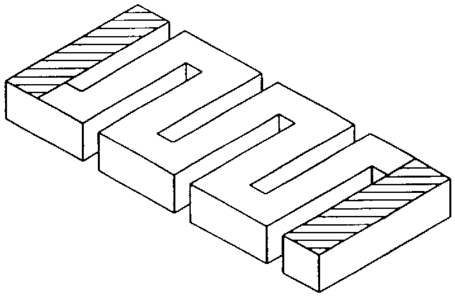
FIG. 5B shows an alternate embodiment of the piezoelectric element.

Both attachment arrangements shown in FIGS. 1A and 5A can be made with an alternate piezoelectric configuration with multiple legs (more than three) and attached as shown in FIGS. 1B and 5B, respectively. Arrangement using the configuration of in FIG. 1B produces a larger piezoelectric force and across the data tracks translation motion of the slider while the arrangement in FIG. 5B produces a larger piezoelectric stroke and rotary motion of the slider transducer across the data tracks during extension or contraction of the unbonded piezoelectric legs.

In practice, external wires, not seen, are brought to the terminals 22 to connect the power to the piezoelectric element 20. When power is applied, change in length of the crystal occurs in the unattached portions that extend or contract longitudinally along the lateral dimension of the flexure member 12. Consequently, depending on direction of polarization, translational movement upwardly or downwardly (as shown by the arrows 15) will take place for the case shown on FIG. 1A and rotary movement for the case shown in FIG. 5A. The ultimate result is that the slider 18, and hence the transducer 24, will be forced to move as indicated in a desired direction and by a desired amount across the data tracks. This movement of head transducer is by applying power to Piezoelectric element and is used by disk drive servo system to correct for of-track movement of the slider caused by external and internal disturbances during seek and track following.

The invention having been thus described with particular reference to the preferred forms thereof, it will be obvious that various changes and modifications may be made therein without departing from the spirit and scope of the invention as defined in the appended claims.

What is claimed is:

1. A disk drive system having a flexure to support a slider, the slider carrying a transducer head and a microactuator device effecting fine positioning of the transducing head; the microactuator device comprising:

an S-shaped piezoelectric element disposed between said slider and said flexure member, wherein said S-shaped piezoelectric element has an oblong unattached portion extending longitudinally along the lateral dimension of the flexure member and first and second leg portions, wherein said first leg portion is affixed or connected to one end of said slider and said second leg portion is affixed or connected to said flexure member.

2. The disk drive system of claim 1, wherein said S-shaped piezoelectric element has at least three legs that produce a force large enough to overcome resistance to slider movement across data tracks.

3. The disk drive system of claim 1, wherein the slider is positioned at the bottom surface of the flexure member and the attachment of the S-shaped piezoelectric element to the slider is made to the upper surface of the slider, while the attachment of the piezoelectric element to the flexure member is made to the bottom surface of the flexure member.

4. A disk drive system having a flexure to support a slider, the slider carrying a transducer head and a microactuator device effecting fine positioning of the transducing head; the microactuator device comprising:

an S-shaped piezoelectric element disposed between said slider and said flexure member, wherein said S-shaped piezoelectric element comprises at least a center leg portion, a first end leg portion and a second end leg portion, wherein said center leg portion is affixed or connected to the flexure member right above a load beam dimple, and said first and second end legs portions are affixed to the slider for obtaining rotary motion of the slider to enable increased motion of the slider transducer across data tracks.

5. The disk drive system as defined in claim 4, wherein the slider is positioned at the bottom surface of the flexure member and the attachment of the S-shaped piezoelectric element to the slider is made to the upper surface of the slider, while the attachment of the piezoelectric element to the flexure member is made to the bottom surface of the flexure member.

6. A microactuator device for effecting fine positioning of a transducing head with respect to a selected track on a disk comprising: a slider, a flexure member, and an S-shaped piezoelectric element having opposite ends, wherein said S-shaped piezoelectric element is disposed between said slider and said flexure member, wherein said S-shaped piezoelectric element has an oblong unattached portion extending longitudinally along the lateral dimension of the flexure member and first and second leg portions, wherein said first leg portion is affixed or connected to one end of said slider and said second leg portion is affixed or connected to said flexure member.

7. A microactuator device of claim 6 wherein single direction polarization through the entire S-shaped piezoelectric element selectively produces opposite movements of the transducing head by changing the polarity of applied voltage.

* * * * *